(12) United States Patent
Sakaida et al.

(10) Patent No.: US 7,022,244 B2
(45) Date of Patent: Apr. 4, 2006

(54) METHOD AND APPARATUS FOR GENERATION OF FINE PARTICLES

(75) Inventors: Atusi Sakaida, Nagoya (JP); Toshihisa Taniguchi, Handa (JP); Hiroshi Tanaka, Toyokawa (JP)

(73) Assignee: DENSO Corporation, Kariya (JP)

( * ) Notice: Subject to any disclaimer, the term of this patent is extended or adjusted under 35 U.S.C. 154(b) by 340 days.

(21) Appl. No.: 10/651,153

(22) Filed: Aug. 28, 2003

(65) Prior Publication Data

US 2004/0042969 A1 Mar. 4, 2004

(30) Foreign Application Priority Data

Aug. 30, 2002 (JP) ............................. 2002-255187

(51) Int. Cl.
*H01L 21/00* (2006.01)
*B01D 47/06* (2006.01)

(52) U.S. Cl. .............................. 216/2; 216/83; 216/90; 216/96; 216/99; 261/78.2

(58) Field of Classification Search .................... 216/2, 216/83, 90, 96, 99; 261/78.2
See application file for complete search history.

(56) References Cited

U.S. PATENT DOCUMENTS 5,718,863 A * 2/1998 McHugh et al. ............. 264/309
5,782,010 A * 7/1998 Boersen et al. ................ 34/359
6,189,214 B1 * 2/2001 Skeath et al. ........... 29/890.142

FOREIGN PATENT DOCUMENTS

JP          5-275401         10/1993

* cited by examiner

*Primary Examiner*—Shamim Ahmed
(74) *Attorney, Agent, or Firm*—Harness, Dickey & Pierce, PLC

(57) ABSTRACT

To supply microfine liquid droplets to a microscopic space for enabling micromachining and provide a method and an apparatus for forming the microfine liquid droplets, there is provided a method and an apparatus for generating liquid fine particles, comprising atomizing a liquid, fractionating the atomized liquid particles to form microfine liquid droplets by inertial fractionation and contacting the microfine liquid droplets with a heated carrier gas, thereby thermally drying the liquid particles to form finer particles.

7 Claims, 4 Drawing Sheets

METHOD AND APPARATUS FOR GENERATION OF FINE PARTICLES

TECHNICAL FIELD OF THE INVENTION

The present invention relates to a method and an apparatus for the generation of liquid fine particles, more specifically, the present invention relates to a method and an apparatus for the generation of liquid fine particles, which can generate microfine liquid particles of a submicron order.

BACKGROUND ART

Recently, manufacture of sensors or actuators, with microscopic dimensions, and by using micromachining, is attracting attention.

Figure 1:
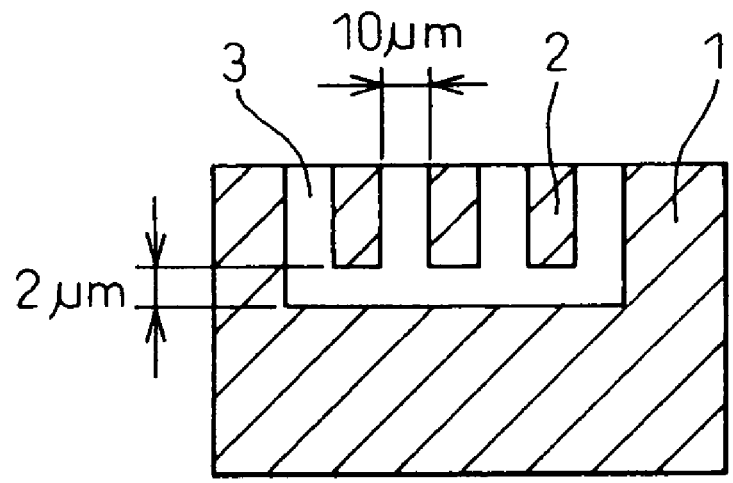
Figure 2:
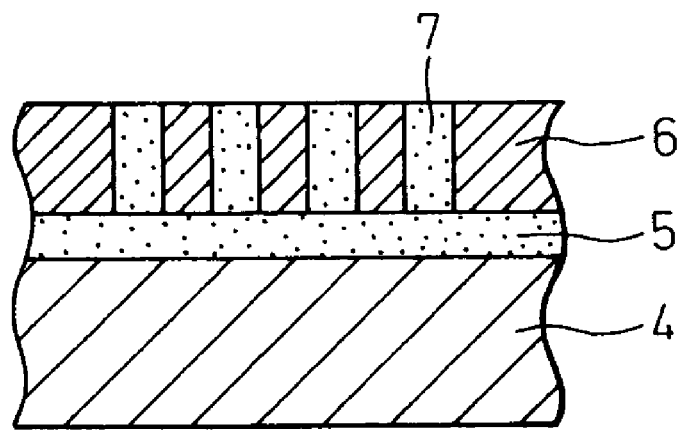
Figure 3:
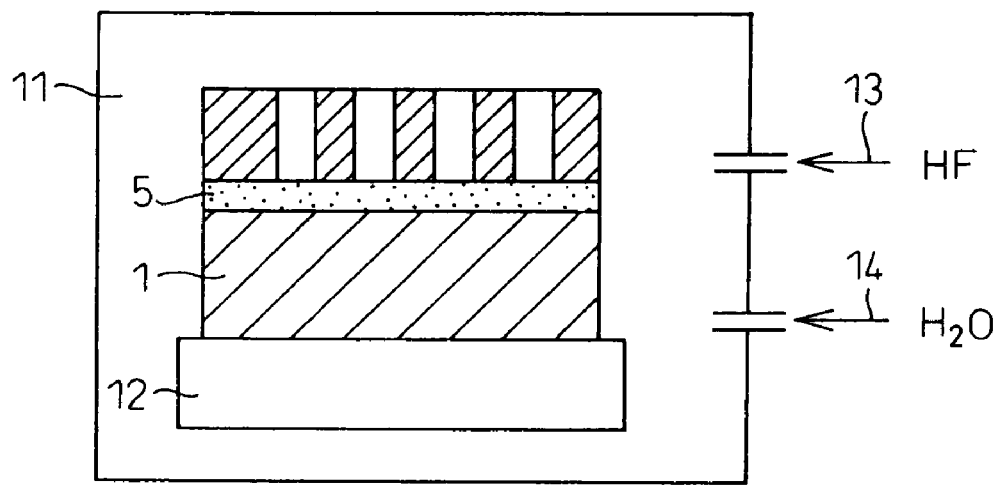
Figure 4:
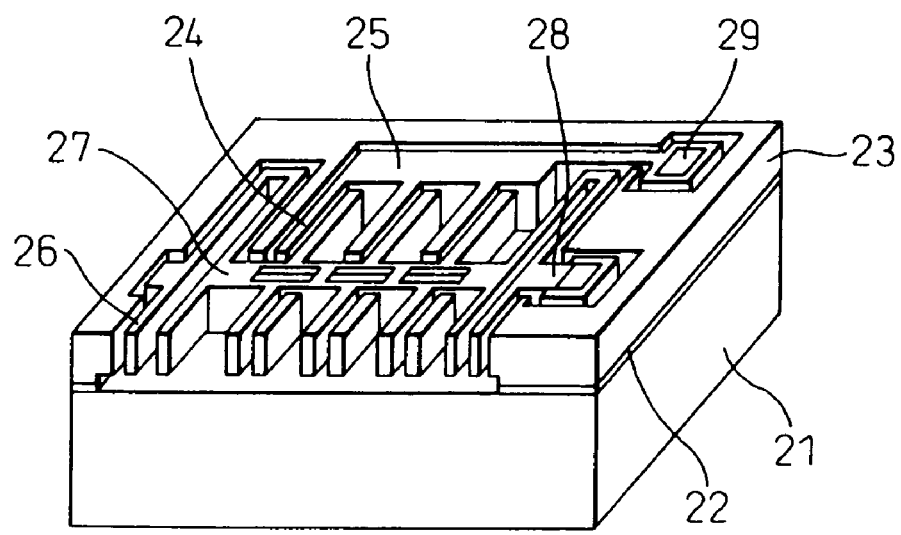

For example, a semiconductor sensor with a three-dimensional structure having a cross-section shown in FIG. 1 has been proposed. In FIG. 1, for example, a microscopic space 3 giving a beam interval of 10 µm and a floating height of 2 µm from the silicon chip 1 is created in a silicon chip to form a cantilever 2. This microscopic space 3 is created during the formation of a silicon substrate 4 by embedding a sacrificial oxide film layer 5 into the portion which becomes the space later, forming a sensor structure on a silicon layer 6 above the sacrificial oxide film layer 5 by patterning, selectively oxidizing the silicon layer 6, and then dissolving and removing the oxide pattern 7 between beams 2 and the sacrificial oxide film layer 5 in the portion under the beam 2. To remove this oxide film layer, removal by a hydrofluoric acid solution is the simplest and easiest method but when the oxide film layer becomes a winding microscopic space and is treated with a hydrofluoric acid solution as a liquid, the liquid attaches to the narrow space during the removal treatment or the drying of the treating solution and, by the surface tension thereof, a movable beam is drawn to a fixed beam. When drying is performed when this force is applied, the movable beam sticks to the fixed beam in a stuck state and the product obtained cannot be used as a sensor. Therefore, in order to attain the removal while not imposing a load such as surface tension of liquid, use of a gaseous hydrofluoric acid (hydrofluoric acid anhydride) is necessary. However, the reaction proceeds at an extremely low rate with only a hydrofluoric acid anhydride and therefore, water such as pure water or an alcohol must to be mixed in the form of a vapor. More specifically, as shown in FIG. 3, a silicon chip 1 comprising a sacrificial oxide film layer 5 is placed in a treatment chamber 11 and a hydrofluoric acid anhydride 13 and water vapor 14 are introduced into the treatment chamber 11 under heating by a heating device 12 and mixed in the treatment chamber 11, thereby removing the sacrificial oxide film layer 5.

However, the method of introducing a hydrofluoric acid anhydride 13 and a water vapor 14 into the above-described treatment chamber 11 and mixing them in the treatment chamber 11 has a problem in that the balance between the hydrofluoric acid anhydride and the water vapor is difficult to control and, in the case of processing a complicated structure, the microscopic space is filled with excess water and, after the removal of the sacrificial oxide film layer, the structure collapses.

If the amount of water vapor is reduced not to generate excess water, this processing method is difficult to use in practice because, for example, the reaction rate seriously decreases and the process becomes extremely low in the productivity.

Under these circumstances in conventional techniques, an object of the present invention is to supply microfine liquid droplets to the above-described microscopic space and, to realize this, to provide a method and an apparatus for forming microfine liquid droplets.

SUMMARY OF THE INVENTION

To attain the above-described object, the present invention provides the followings.

(1) A method for generating liquid fine particles comprising atomizing a liquid to form atomized liquid particles, fractionating microfine liquid droplets from said atomized liquid particles by inertial fractionation, and contacting said microfine liquid droplets with a heated carrier gas, to thereby thermally dry said microfine liquid droplets to form liquid droplets which are finer than said microfine liquid droplets.

(2) The method for generating liquid fine particles as described in (1) above, wherein in said fractionating, microfine liquid droplets having a diameter of 10 µm or less are fractionated by inertial fractionation from atomized liquid particles which are generated by the atomization and include liquid particles having a diameter exceeding 10 µm, and said fractionated microfine liquid particles having a diameter of 10 µm or less are then thermally dried to form further finer liquid particles having a diameter of 1 µm or less.

(3) The method for generating liquid fine particles as described in (1) and (2) above, wherein the liquid is an aqueous solution and the inertial fractionation is fractionation utilizing the difference in collision energy of atomized liquid particles against a wall.

(4) The method for generating liquid fine particles as described in (1) to (3) above, wherein the inertial fractionation is performed twice or more.

(5) The method for generating liquid fine particles as described in (1) to (4) above, wherein the atomization of the liquid using an injection gas is performed in a liquid tank to form atomized liquid particles, the inertial separation is performed by colliding said atomized liquid particles against the inner wall of the liquid tank, and thereby coarse liquid droplets in said collided atomized liquid particles are re-circulated to the liquid tank, by which the injection gas used is dissolved in a liquid in the liquid tank and, at jetting for said atomization, the atomized liquid particles are decompressed to cause expansion and bursting of the injection gas dissolved in the atomized liquid to accelerate the formation of fine particles of the atomized liquid.

(6) The method for generating liquid fine particles as described in (1) to (5) above, wherein the liquid is an etching solution and the liquid fine particles are used for micromachining.

(7) The method for generating liquid fine particles as described in (1) to (6) above, wherein the liquid is an aqueous hydrofluoric acid solution and the liquid fine particles are used for etching a silicon oxide film.

(8) An apparatus for generating liquid fine particles, comprising means of atomizing a liquid, means of inertially fractionating the resulting atomized liquid particles to obtain microfine liquid droplets, and means of drying the obtained microfine liquid droplets with a heated carrier gas to form finer liquid particles.

(9) The apparatus for generating liquid fine particles as described in (8) above, wherein the atomizing means has a constitution that an injection gas is jetted in a liquid tank to cause suction and jetting of the liquid in the liquid tank and the atomized liquid particles formed by the jetting are collided against the inner wall of the liquid tank, thereby performing inertial fractionation.

(10) The apparatus for generating liquid fine particles as described in (9) above, wherein a nozzle is provided at the top of the liquid tank and microfine liquid droplets inertially fractionated by the collision against the inner wall of the liquid tank are passed through the nozzle and accelerated to collide against a wall present above the nozzle, thereby again performing the inertial fractionation.

(11) The apparatus for generating liquid fine particles as described in (8) to (10) above, wherein a heated carrier gas is fed into the transportation path of the inertially separated microfine liquid droplets to dry the microfine liquid droplets and form finer liquid particles.

BRIEF DESCRIPTION OF DRAWINGS

FIG. 1 is a partial cross-sectional view of a semiconductor sensor.

FIG. 2 is a cross-sectional view of a silicon substrate having a sacrificial oxide film layer for forming the semiconductor sensor of FIG. 1.

FIG. 3 is a view showing a treatment chamber in conventional microetching processes.

FIG. 4 is a view showing one example of a semiconductor sensor.

FIG. 5 is a schematic view for explaining a working example of the method and the apparatus for forming ultrafine liquid droplets according to the present invention.

FIG. 6 is a view showing the principle of inertial fractionation.

MODE FOR CARRYING OUT THE INVENTION AND EXAMPLES

By noting the fact that the oxide film layer is stably removed by a hydrofluoric acid solution at a highest speed as described in the Background Art, the present invention provides a method for producing ultrafine liquid droplet particles capable of being directly fed into the microscopic space unlike conventional techniques where a hydrofluoric acid solution is prepared by mixing a gas and a water vapor, and, thereby, solving the problems in conventional techniques.

The reason why water or an alcohol needs to be mixed with the hydrofluoric acid in use for the etching of a silicon oxide film is that when water or an alcohol is present together with the hydrofluoric acid (here, when water is present) the following reaction takes place (a similar reaction takes place also when an alcohol, for example, an ethanol is present):

$$2HF\ (g)+H_2O\ (aq)\rightarrow 2HF_2^-+2H^++H_2O\ (aq)$$

to produce F ion and, due to the presence of this F ion, the ollowing reaction occurs:

$$SiO_2+2HF_2^-+2H^+\rightarrow SiF_4+2H_2O$$

whereby etching of $SiO_2$ readily proceeds, however, when $H_2O$ or an alcohol is not present, the F ion is not produced and $SiO_2$ must be etched only with anhydrous HF and the etching rate is unlimitedly low. Therefore, introduction of water is inevitable at present.

FIG. 4 shows an example of a semiconductor sensor. In the Figure, 21 is a silicon substrate, 22 is an embedded oxide film, 23 is a silicon layer, 24 is a movable electrode, 25 is a fixed electrode, 26 is a beam, 27 is a plumb, 28 is an anchor and 29 is a pad.

The present invention provides a method for forming ultrafine particles of a hydrofluoric acid solution for performing the microfine processing of a microdevice as shown in FIG. 1 or FIG. 4.

FIG. 5 shows the state where the method of the present invention is practiced. A hydrofluoric acid solution 32 is charged in a chemical tank and, for example, a nitrogen gas 34 is fed into an atomization nozzle 33 to atomize the hydrofluoric acid solution 32. The atomized liquid particles 35 of the hydrofluoric acid solution contain particles having a diameter of 20 μm or more. These atomized liquid particles 35 are collided against the inner wall 36 of the chemical tank 31 and, as a result, atomized liquid particles 35 having a large diameter attach to the wall 36 due to their large inertial energy, whereas atomized microfine liquid droplets can be reflected from the wall due to their small inertial energy. For example, microfine liquid droplets 37 having a diameter of less than 10 μm can remain above the surface of the liquid 32 in the tank 31.

FIG. 6 shows the principle of inertial fractionation of liquid drop particles. In the case where the liquid droplet jetted out from the ejection nozzle 51 is a large particle 52, the liquid droplet 52 is crushed onto colliding against a wall 53 due to its large inertial energy, attaches 54 to the wall 53 and is not repelled. On the other hand, in the case where the liquid droplet jetted out from the ejection nozzle 51 is a small particle 55, the liquid droplet 55 is not crushed on colliding against the wall 53 due to its small inertial energy but can be repelled 56 from the wall and can float. As schematically shown in the left of FIG. 6, when the particle size is larger than a certain value, the liquid droplet is crushed and not repelled, whereas when the particle size is smaller than a certain value, the liquid droplet is not crushed and is repelled. By making use of this property, liquid droplet particles having a small particle size can be fractionated. The size of the liquid droplet fractionated can be changed to a certain extent by controlling the size of the liquid droplet atomized and the speed in colliding against wall.

In the atomizing apparatus shown in FIG. 5, an atomization nozzle is provided in the chemical tank and therefore, an ejection gas (nitrogen gas) is dissolved in the chemical (hydrofluoric acid solution) to a saturated concentration. When this hydrofluoric acid solution having dissolved therein a nitrogen gas to a saturated concentration is atomized, the hydrofluoric acid solution is decompressed at the atomization and, as a result, the nitrogen gas dissolved therein expands and acts to tear apart the liquid droplet and this provides an effect that fine particles can be more effectively formed. Furthermore, the particle size can be controlled independently of the concentration of liquid droplet chemical (which is adjusted by the concentration of solution) and this provides an effect that the conditions of various treatments using the liquid droplets can be established over a wide range. In addition, the liquid is allowed to act directly and this provides an effect that a treating rate far higher than in a conventional gas-type treatment can be realized.

The microfine liquid droplets 37 of less than 10 μm may be sent to the drying step but, in FIG. 5, a nozzle part 38 is further formed at the top of the chemical tank 31, whereby the microfine liquid droplets 37 which are light and therefore, ascend due to pressure of the atomizing gas are accelerated through the nozzle part 38 to collide against the inner wall 40 of a buffering chamber 39 and are again sorted by inertial energy into finer particles. By passing through this process, the liquid particles can be made and sorted even into a size of a few µm or less.

The microfine liquid droplets 41 thus sorted into a size of a few µm or less are supplied to a treatment chamber 46 but in the supply tube 42 are mixed with a nitrogen gas 44 heated through a heating chamber 43, whereby the microfine liquid droplets 41 of a few µm are heated and dried and the components are evaporated according to the degree of heating, as a result, individual microfine liquid droplets are formed into finer particles and ultrafine liquid droplets 45 are produced. The ultrafine liquid droplets 45 may have a size of less than 1 µm. By selecting the conditions for inertial fractionation and dry processing or depending on the kind of liquid, further finer liquid droplets can be also obtained, for example, ultrafine liquid droplets of 0.4 µm or less.

Figure 5:
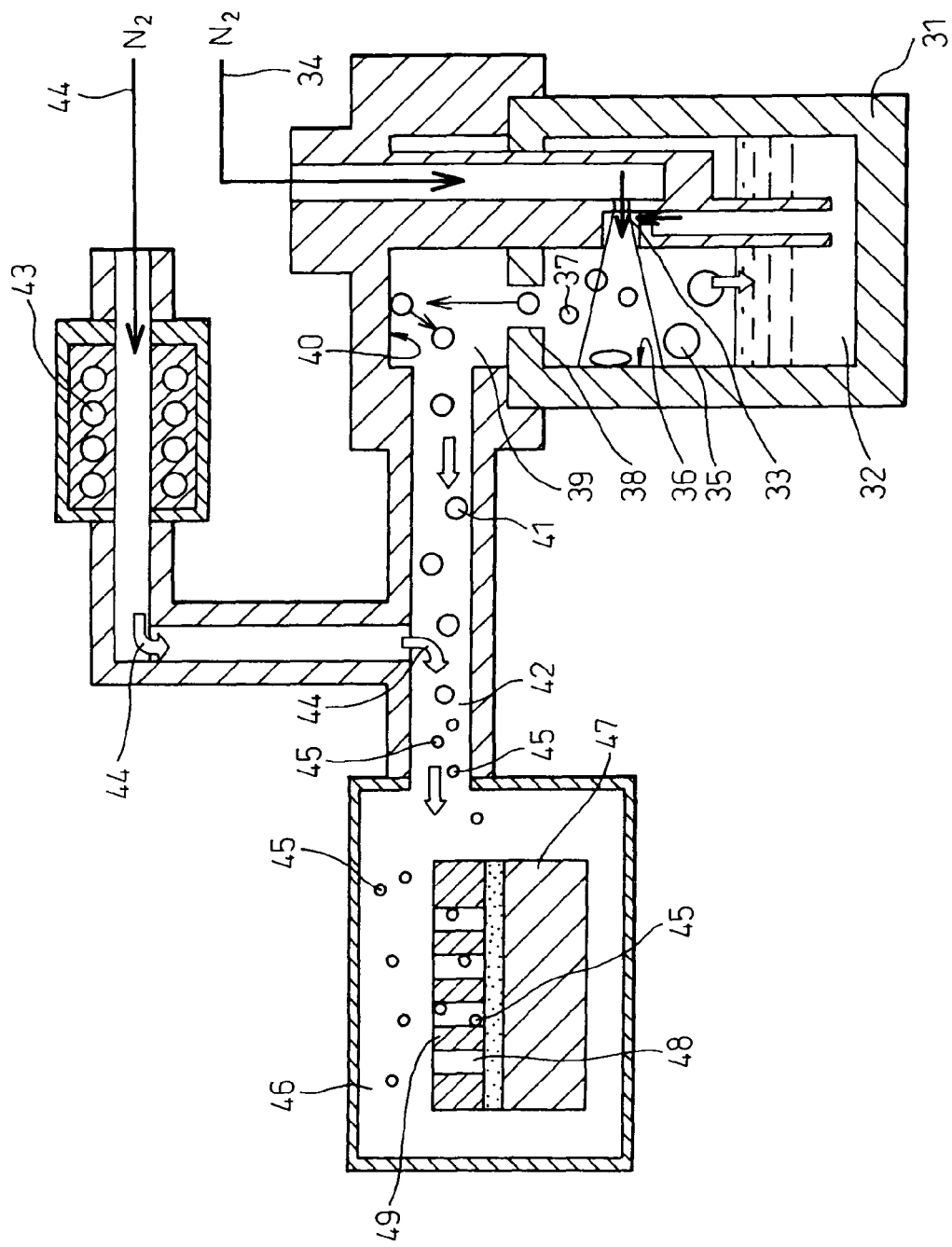
Figure 6:
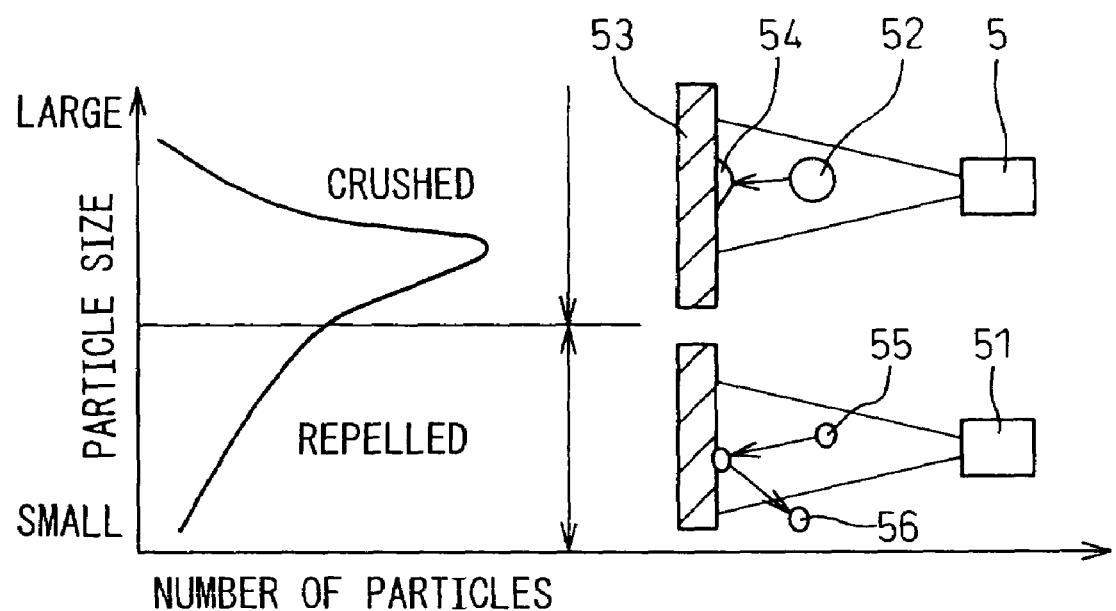

When liquid droplets of the hydrofluoric acid solution thus formed into ultrafine particles of less than 1 µm are introduced into a treatment chamber 46 and used for the etching to remove an oxide film layer 48 of a silicon chip, as the diameter of the liquid droplets is sufficiently small, the liquid droplets, even if attached to a beam 49, do not act to draw a movable beam and a fixed beam, which are formed with a distance of 10 µm therebetween, to each other by the surface tension of the liquid. Moreover, the hydrofluoric acid solution contains water and therefore, the etching of silicon can proceed at a desired high speed. FIG. 5 shows ultrafine liquid droplets 45 drawn in the oxide film layer 48 but this is the state where etching of the oxide film proceeds to form a vacancy and, thereafter, the ultrafine liquid droplets 45 intrude into the vacancy. Needless to say, ultrafine liquid droplets 45 are not present there when an oxide film exists.

In the foregoing pages, the case of forming microfine particles of a hydrofluoric acid solution by using a nitrogen gas is described, however, the kind of the liquid is not limited and as can be understood, not only a solution but also one kind of liquid can be formed into liquid droplets and into microfine particles and furthermore, the atomization or heat-drying treatment can be performed by using a gas other than nitrogen.

The concentration of hydrofluoric acid solution used, conditions for atomization, conditions for collision against wall of chemical tank or buffer chamber, and conditions for drying under heat can be freely selected according to the kind of treatment. For example, in order to etch a silicon oxide film shown in FIG. 1, an aqueous 49% hydrofluoric acid solution was used as a raw material and ultrafine liquid droplets of less than 1 µm were formed as described above. At this time, the etching of the silicon oxide film was performed in a treatment chamber at 40° C. but in the heat-drying treatment with nitrogen gas at the previous stage, a nitrogen gas heated at 60 to 90° C. was used. The heat-drying treatment is apparently affected by the flow rate of heating gas as well as the temperature and therefore, the temperature and the flow rate should be appropriately selected according to the need. In the Example, the treatment of removing the oxide film was suitably performed when 20 to 40% of the hydrofluoric acid solution was evaporated with a heating gas at a flow rate of 8 to 12 L/min. When the hydrofluoric acid solution was insufficiently evaporated, sticking of beams occurred.

An oxide film of a semiconductor sensor was etched by using ultrafine liquid droplets of hydrofluoric acid solution prepared in Example of the present invention, as a result, sticking of beams did not occur even when the oxide film was etched at an etching rate of 15 to 25 nm/min.

On the other hand, a method of etching an oxide film of completely the same semiconductor sensor by using a liquid hydrofluoric acid, a method of introducing dry hydrofluoric acid anhydride and water vapor into a treatment chamber and mixing them there, and a method of performing the etching with a vapor phase containing hydrogen fluoride gas, a slight amount of water vapor and nitrogen described in Kokai No. 5-275401 were practiced and compared. In the method of using a liquid hydrofluoric acid, sticking could not be prevented. In the method of introducing dry hydrofluoric acid anhydride and water vapor into a treatment chamber and mixing them there, the etching rate was only from 0.2 to 2 nm/min under conditions that did not cause sticking. In the method described in Kokai No. 5-275401, the etching rate was from 2 to 4 nm/min under the conditions of not causing sticking. Accordingly, it is verified that in the method of the present invention, an etching rate as high as about 5 to 10 times can be realized under conditions of not generating sticking of beams as compared with the method described in Kokai No. 5-275401.

The etching rate shown here is determined for a specific semiconductor sensor and varies when the setting conditions are changed but the usefulness of the present invention is not lost.

According to the present invention, a method and an apparatus for forming liquid droplet fine particles into ultrafine particles of 1 µm or less are provided. By using a treating solution after forming it into microfine particles, wet processing free of defects can be attained even when the microfine particles are used for micromachining.

The invention claimed is:

1. A method for generating liquid fine particles comprising atomizing a liquid to form atomized liquid particles, fractionating microfine liquid droplets from said atomized liquid particles by inertial fractionation, and contacting said microfine liquid droplets with a heated carrier gas, to thereby thermally dry said microfine liquid droplets to form liquid droplets which are finer than said microfine liquid droplets.

2. The method for generating liquid fine particles as claimed in claim 1, wherein in said fractionating, microfine liquid droplets having a diameter of 10 µm or less are fractionated by inertial fractionation from atomized liquid particles which are generated by the atomization and include liquid particles having a diameter exceeding 10 µm, and said fractionated microfine liquid particles having a diameter of 10 µm or less are then thermally dried to form further finer liquid particles having a diameter of 1 µm or less.

3. The method for generating liquid fine particles as claimed in claim 1, wherein said liquid is an aqueous solution and said inertial fractionation is fractionation utilizing the difference in collision energy of atomized liquid particles against a wall.

4. The method for generating liquid fine particles as claimed in claim 1, wherein said inertial fractionation is performed twice or more.

5. The method for generating liquid fine particles as claimed in claim 1, wherein said atomization of the liquid using an injection gas is performed in a liquid tank to form atomized liquid particles, the inertial separation is performed by colliding said atomized liquid particles against the inner wall of the liquid tank, and thereby coarse liquid droplets in said collided atomized liquid particles are re-circulated to the liquid tank, whereby the injection gas used is dissolved in a liquid in the liquid tank and, at jetting for said atomization, the atomized liquid particles are decompressed to cause expansion and bursting of the injection gas dissolved in the atomized liquid and to accelerate the formation of fine particles of the atomized liquid.

6. The method for generating liquid fine particles as claimed in claim 1, wherein said liquid is an etching solution and said liquid fine particles are used for micromachining.

7. The method for generating liquid fine particles as claimed in claim 1, wherein said liquid is an aqueous hydrofluoric acid solution and said liquid fine particles are used for etching a silicon oxide film.

* * * * *